United States Patent Office 3,031,704
Patented May 1, 1962

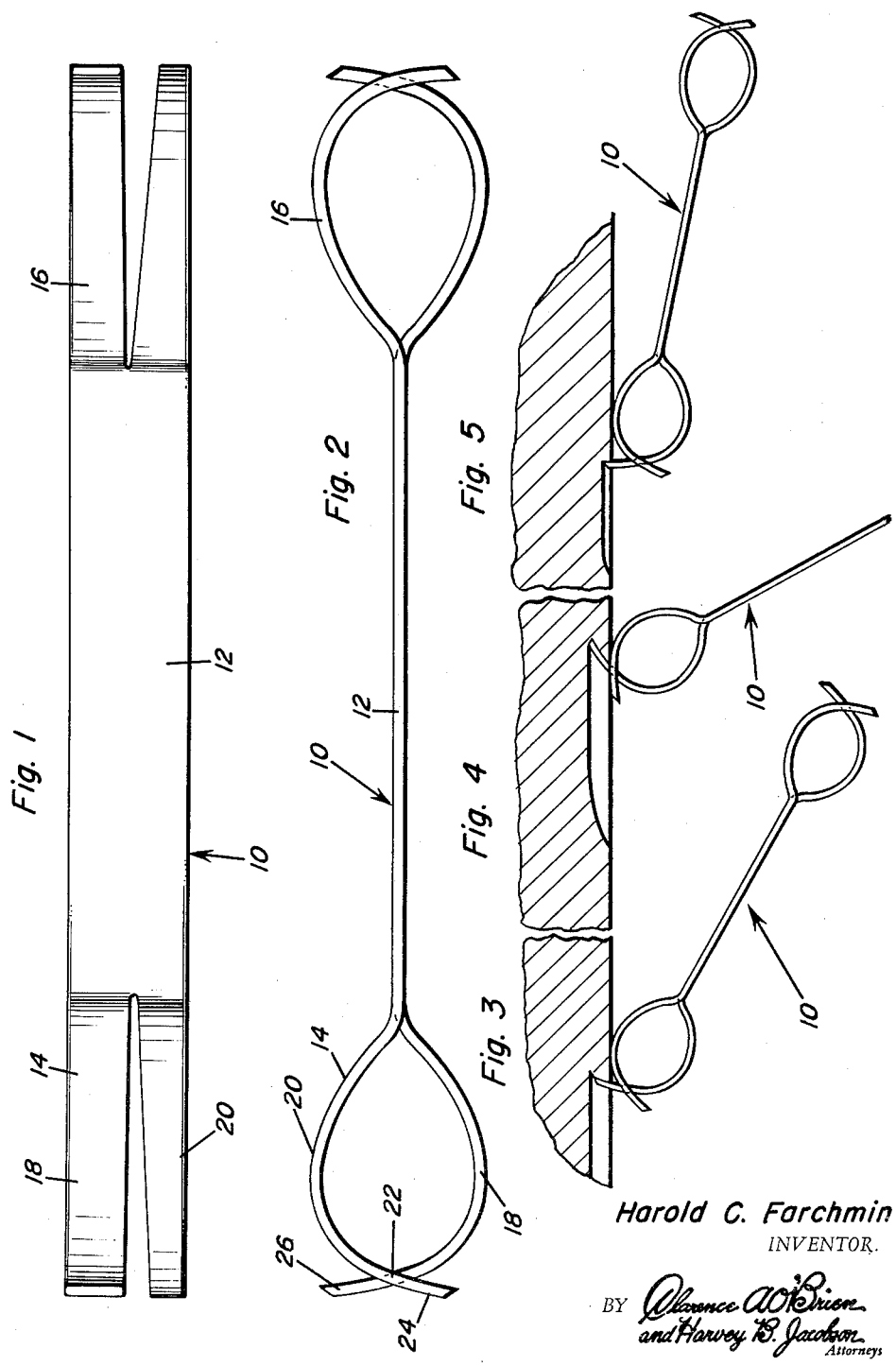
May 1, 1962  H. C. FARCHMIN  3,031,704
MASONRY JOINT RAKE
Filed Jan. 7, 1960
Harold C. Farchmin
INVENTOR.

3,031,704
MASONRY JOINT RAKE
Harold C. Farchmin, 805 Meadow Lane, Elm Grove, Wis.
Filed Jan. 7, 1960, Ser. No. 1,098
6 Claims. (Cl. 15—105.5)

This invention relates to a mortar rake, and more particularly to a simplified mortar rake which may be used for raking mortar joints between any type of masonry courses.

An object of the invention is to provide a greatly simplified mortar rake possessing a number of advantages such as simplicity of construction, versatility and longevity.

Briefly, a mortar rake in accordance with the invention is a tool having an essentially flat handle and a pair of prongs, and the prongs are configured as oppositely curved prongs which cross each other, leaving blades projecting oppositely. One prong functions as a runner while the other prong functions as a raking tool, and the depth of rake is preferably governed by bending the prongs so that they overlap a greater or lesser amount.

A rake in accordance with the invention is superior to other rakes because other rakes which are now commercially available may be used only on even surfaces, since most of them straddle the mortar bed. The rake in accordance with the invention may be used with uneven and rough faced masonry of all types.

Another great advantage in the invention is that the pair of prongs are each of a different width, at least at the blade end thereof, in order to have available a proper width blade to be used with different thicknesses of mortar beds.

These, together with other objects and advantages which will become subsequently apparent, reside in the deails of construction and operation as more fully hereinafter described and claimed, reference being had to the accompanying drawings forming a part hereof, wherein like numerals refer to like parts throughout, and in which:

FIGURE 1 is a top plan view of a rake in accordance with the invention.

FIGURE 2 is a side elevational view of the rake in FIGURE 1.

FIGURE 3 is a diagrammatic side view showing the rake in use.

FIGURE 4 is another diagrammatic view showing the rake adjusted for a further use.

FIGURE 5 is a diagrammatic view showing a further adjustment of the rake.

In the accompanying drawings, there is an illustration of a mortar rake 10 which exemplifies the invention. The mortar rake is made of flat metal stock configured with an essentially flat, straight handle or handle portion 12 between the end sections 14 and 16 thereof. Inasmuch as the rake 10 is preferably made of integral metal construction, sections 14 and 16 are made integral with handle 12. Further, although the handle is essentially rectangular and flat in configuration, it is evident that this area may be altered insofar as shape is concerned.

Sections 14 and 16 are identical insofar as general construction is concerned. Typical section 14 is made of two prongs 18 and 20 formed as integral extensions of one end of handle 12. The prongs are smoothly curved in approximately hyperbolic shape, i.e., when viewed from the side edge (FIGURE 2), the prongs are smoothly curved, each in concavo-convex fashion, with the concave portions confronting each other and laterally adjacent. Prongs 18 and 20 cross, as at 22, leaving divergent, selectively usable blades 24 and 26 extending beyond the crossing of the prongs. The blades each preferably has a bevelled edge.

The two prongs are each bendable so that they may overlap more or less to determine the length of blades 24 and 26, the blades defined as those portions of prongs 18 and 20 protruding beyond the point 22 of crossing. This will allow a greater or lesser penetration of the mortar bed during the use of the rake, postulating that the rake will be held at approximately the same angle with respect to the surface of the work.

Sections 14 and 16 were said to be essentially similar. The difference between the two sections is found in the width of the edges of the blades. The width of each blade is slightly different so that there are available four different widths of blades in the same rake 10. In using the rake, this will permit the mason to compensate for different thicknesses of mortar beds. Further, it is intended that the outer surfaces of the prongs adjacent to the prong being used function as a guide by bearing against either the lower or the upper block, stone, brick, etc. in the wall, while the blade is used for raking the joint.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A masonry joint rake comprising a handle, said handle having a blade section at one end, said blade section comprising a pair of prongs extending longitudinally from said handle, said prongs each being oppositely curved with end portions crossed, thereby defining divergent, selectively usable blades which are made of the parts of the prongs protruding beyond the crossing point of the prongs.

2. A masonry joint rake comprising a handle, said handle having a blade section at one end, said blade section comprising a pair of prongs extending longitudinally from said handle, said prongs each being oppositely curved with end portions crossed, thereby defining divergent, selectively usable blades which are made of the parts of the prongs protruding beyond the crossing point of the prongs, said prongs being bendable so that at least one of the prongs may be bent with respect to the other of the prongs, thereby altering the length of the blades.

3. A masonry joint rake comprising a handle, said handle having a blade section at one end, said blade section comprising a pair of prongs extending longitudinally from said handle, said prongs each being oppositely curved with end portions crossed, thereby defining divergent, selectively usable blades which are made of the parts of the prongs protruding beyond the crossing point of the prongs, said prongs being bendable so that at least one of the prongs may be bent with respect to the other of the prongs, thereby altering the length of the blades, one of the prongs having an outer surface adapted to rest on the masonry adjacent to the mortar bed being raked and functioning as a guide for the rake.

4. A masonry joint rake comprising a handle, and a pair of prongs on said handle, said prongs being oppositely curved and crossed at an intermediate point and including divergent, selectively usable mortar scraping blades on their free ends.

5. A masonry point rake in accordance with claim 4, wherein said blades are of different widths for use in masonry points of various thicknesses.

6. A masonry joint rake in accordance with claim 4, wherein the prongs are bendable for adjusting the blades laterally.

References Cited in the file of this patent

UNITED STATES PATENTS

| | | |
|---|---|---|
| 1,445,021 | Johnson | Feb. 13, 1923 |
| 2,636,500 | Schwartz | Apr. 28, 1953 |

FOREIGN PATENTS

| | | |
|---|---|---|
| 78,384 | Switzerland | July 16, 1918 |